Patented Feb. 28, 1939

2,148,831

UNITED STATES PATENT OFFICE 2,148,831

PROCESSED RUBBER CHLORIDE AND
METHOD OF PROCESSING

James Wallace Reynolds, Nitro, W. Va., assignor
to The Raolin Corporation, Charleston, W. Va.,
a corporation of West Virginia No Drawing. Application March 17, 1936,
Serial No. 69,414

13 Claims. (Cl. 106—23)

This invention relates to processed rubber chloride and methods of processing; and it comprises a form of rubber chloride insoluble in toluol and other volatile solvents including coal tar hydrocarbons; and it comprises a method wherein a rubber chloride preparation containing volatile solvent receives an addition of small quantities, seldom as much as 1 per cent on the chloride, of certain catalytic bodies, and is freed of said solvent and cured by heat; all as more fully hereinafter set forth and as claimed.

Rubber chloride carrying 64 to 66 per cent chlorine has been known very many years but it is less used in coatings and plastics than its inherent properties warrant. It is uninflammable, stable, quite inert against chemical actions, and is resistant to most of the common liquids with which a coating or plastic article would come into contact. In particular, it is not affected by water or aqueous solutions of acids, salts and alkalies, by alcoholic liquids or alcohol itself, by petroleum oils, such as gasoline, lubricating oil and crude oil, etc. It is soluble in a few solvents, but it is not indefinitely miscible with all these.

Rubber chloride is made by chlorinating rubber in solution in carbon tetrachloride, or some other chlorinated solvent resistant to chlorine; the introduction of the gas being continued as long as it is taken up. In so doing, the unsaturated character of the original rubber disappears; the rubber chloride is not capable of "vulcanization" with sulfur. Commercial rubber chloride is a non-thermoplastic, solid, friable resin which alone has no great value but which can be compounded by mixing, solution, solvation, etc., with plasticizing bodies obviating its brittleness and friability and giving materials useful in coatings and in plastics. Light oils from coal tar (benzol, toluol, xylol, etc.) are used as solvents and thinners. After removal of the solvent the resulting dry material is substantially inert and is more or less thermoplastic, this depending on the degree to which it has been plasticized and the particular plasticizer used. Coatings can be made containing rubber chloride having unusual water resistance, unusual acid resistance, good electrical insulating properties, and a good heat stability up to 150° C. or thereabouts. It is largely a matter of using the right plasticizers, the right solvents and the right technique.

In making these compositions, the rubber chloride apparently undergoes no chemical change. The rubber chloride of a dried varnish coating can be redissolved in toluol and recovered with its original properties.

I have found that by an addition of certain bodies to rubber chloride compositions and certain treatments, I produce changes, chemical or physical, in the rubber chloride giving it bettered properties; the composition shrinks, becomes denser and its chemical inertness increases. While, as stated, rubber chloride is an extremely inert and stable material soluble in but few solvents, the product of the present process is even more stable and inert and its solubility in any solvent is markedly lessened. It is, for example, made resistant to the coal tar oils in which the original rubber chloride is quite soluble. The change in all properties is progressive going to a maximum. Sometimes a complete action is desired and sometimes it is not. The degree to which it is desirable to carry the action varies with different purposes and the degree effected can be estimated as a matter of test by exposing a film dried on glass to the action of liquid toluol. Completely changed material neither dissolves nor swells while intermediate products swell more or less. Unchanged rubber chloride dissolves at once. Not only is the rubber chloride more resistant to coal tar light oils but it is more resistant to liquids generally and there is improvement in other properties, the improvement in some respects being vast. It is even possible to produce materials which have permanent elasticity and a fair degree of tensile strength; that are rubber-like and still have the valuable properties of rubber chloride. In a general way, dried films are, as contrasted with ordinary types of rubber chloride films, harder, have more gloss, are less thermoplastic and exhibit not only greater resistance to coal tar oils but to all other liquids, including water and aqueous solutions of acids, alkalies and salts; they are less affected by ultraviolet light and atmospheric influences; they weather better.

The nature of the internal changes, chemical or physical, or both, is not known. The action is not vulcanization, although the results are in some ways analogous. For the sake of a name I shall call the result "petronization" since in general it is a hardening action.

There are very many bodies capable of exercising what I call a petronizing effect. All are, however, bodies which in one way or another have some chemical relation to rubber substance, which on admixture with rubber and heating will produce chemical changes therein. Rubber chloride has the general chemical structure of rubber although it does not have the unsaturated groupings important in vulcanizing In general, vulcanizing agents like sulfur are not here useful. Petronizing is an unusual type of change which is not unlike, in its results, coagulation of proteids, as in boiling egg white in water or treating it with alcohol. There is a change in a colloid system, which is irreversible, accompanied by shrinkage and tightening; a petronized film shrinks and tightens, and the change is irreversible. The film becomes denser, loses its thermoplasticity to a greater or less degree and becomes insoluble in the ordinary solvents for rubber chloride, such as the light oils mentioned. One frequent result is a darkening in some degree.

Petronization is an action that may take place in the cold and is much accelerated by heating. The heating temperatures necessary are fairly low, being of the order of 80° to 100° C. Somewhat higher temperatures are not injurious even up to 150° C. and in a way time and temperature are reciprocal. In heating at 80° C. to accomplish full petronization, the period required is of the order of some hours, say 3 to 10. The degree of change can be followed by a toluol test and action interrupted at any desired point.

Among other petronizing agents which I have used with success, are piperidine pentamethylene dithiocarbamate and tetramethyl thiuram monosulphide. There are, however, very many other substances which may be used in "petronizing"; these representing numerous individuals of very many classes of chemical compounds having chemical reactivity with rubber; the reactivity being of the type of that which accelerates vulcanization in curing rubber. The substances, however, do not have any other marked chemical activity and in particular are not basic enough to withdraw chlorine from the chlorinated rubber. Members from the class of thioureas are thiocarbanilide and diorthotolyl thiourea, while among organic bases are hexamethylenetetramine, ammonia, diphenylguanidine, diorthotolyl guanidine, methylene aniline, anhydroformaldehyde aniline and aniline itself. These are all effective in amounts around 1 per cent. In larger amounts hexamethylenetetramine and diphenylguanidine quickly obviate all thermoplasticity. The disubstituted guanidine salts of the dithiocarbamic acids are powerful petronizers, as is the diphenylguanidine salt of dimethylamino dimethyl dithiocarbamic acid. In these compounds both the cation and the anion are effective. Substances which on heating liberate dithiocarbamic acid in the presence of a base are also effective. The oxidation products of the dithiocarbonates are effective. Thiuram mono and di sulfides are useful. Derivatives of di-thiocarbamic acid are also useful, among them being mercaptobenzothiazole which is particularly useful. Like many of these compounds it is more effective in the presence of various basic accelerators, such as zinc oxide, magnesia, lime, litharge, etc. Combinations of mercaptobenzothiazole with chlorinated compounds, such as dinitrochlorbenzene are active petronizers, and particularly when mixed with enough base such as diphenylguanidine to split off the mercaptobenzothiazole, forming the diphenylguanidine salt. Reaction products of aldehydes and amines also function, as for instance, aniline reacted with butyric aldehyde (2 to 8 molecules) in the presence of butyric acid and aniline reacted with 2-4 molecules of either acetylaldehyde or formaldehyde in the presence of valeric or acetic acid. Ammonia reacting with 2–8 molecules of butyl aldehyde in the presence of butyric acid gives a good petronizer. Another class of chemicals giving good petronizers is xanthates, such as zinc butyl xanthate.

These various petronizers are all substances exercising chemical and physical action on rubber; reacting with the rubber molecule and changing the character of the rubber. Some of them are in use in accelerating the union of rubber with sulfur in vulcanization. All have the common properties useful in the present invention of instituting a progressive action on rubber chloride which in the end completely insolubilizes it. With a rubber chloride varnish the addition of a petronizer produces no immediate change beyond, perhaps, a slight darkening; perhaps an optical result of shrinkage, etc. Nor is the film produced after evaporation of the volatile solvent different at first. But in time it becomes harder and denser and is less attackable by solvents. Adhesion to an underlying surface is better. Atmospheric oxygen appears to play no part in these changes. A short heating quickly effects the same actions. Their progress can be, as stated, evaluated by testing with toluol which is a good solvent for unchanged rubber chloride and for plasticizers used with it. A simple and convenient test for petronizing agents is to add 1 per cent of the agent to a neutral, stable, rubber chloride solution. Samples are dried on glass for a number of hours, say 24, and heated for six hours at 90° C. The particular results obtained vary with the rubber chloride solution and with the petronizer. And the products vary, as stated, from rubber-like compositions, having both elasticity and tensile strength all the way to preparations like ebonite or hard rubber. A test of the heated film with toluol shows the extent of petronization. If it be complete toluol does not soften or swell the film.

The hardness and other new properties acquired by a petronized film depend partly on the petronizing agent and on its amount. Generally, but not always, an increase in amount gives an increase in the hardness, etc. Something also depends on the time and temperature in baking. With 1 per cent thiuram disulphide, a rubber chloride film baked at 90° C. or thereabouts for three hours has an increased resistance not only to toluol but to water. A film in water develops no haziness after a number of days. A comparative film without a petronizer in water develops a blue haze in a day.

In petronization at 90° C. a three hour baking treatment is generally employed. This is often longer than is necessary. However, continuation of the heating up to say 6 hours does no harm. The actions are somewhat quicker at 100° C. than at 90° C. Although the operation is called "baking" these temperatures are far below those used with "baking" oil varnishes. The operation is otherwise more convenient. Absence or presence of air makes little difference.

The petronizer should be intimately incorporated with the rubber chloride composition. It may be brought into solution in the varnish or ground in or on a mill. In the composition any of the solid accelerators of petronization mentioned, zinc oxide, etc., must be well dispersed and in intimate contact with the rest of the composition.

Petronized varnishes are useful in protecting labels, metals and other surfaces from corrosive gases, such as HCl and the like, being more efficiently protective than the same composition without the petronizer. Petronized varnishes of this type are well adapted for moisture proofing regenerated cellulose. The protection offered to metal by a well prepared petronized rubber chloride varnish or lacquer is absolute and its coherence to metal is good; provided, of course, the rubber chloride varnish is of good quality. The rubber chloride should be free of turbidity, and the plasticizer well chosen.

Aluminum rods coated with such a varnish withstand the action of caustic soda solution indefinitely and a copper rod so protected is not in any way affected by nitric acid. Lacquers of this type applied to surfaces in time become petronized without the necessity for heating. With a little petronizer in a varnish it will air dry in the usual manner but after the lapse of several days the dry film becomes more resistant to wetting with toluol or xylol and is noticeably harder and freer of aftertack than in comparative tests made with the same varnish without the petronizer.

Petronized varnishes may be ground with pigments of usual types, such as silica, and remarkably resistant coatings are obtained. They tolerate additions of many of the paint and varnish materials now in use. To the extent, however, that other coating materials are present the valuable inertness characterizing rubber chloride is forfeited.

By varying conditions it is possible to prepare fast drying, low temperature baking enamels and under coatings for varnish and paint and the like, which are more advantageous for many purposes than ordinary varnishes, baking oil varnishes, synthetic resin compositions, nitrocellulose lacquers, etc. The varnishes are useful in coating metal racks for protection in plating baths, in protecting equipment against corrosive films and liquids, in chemically resistant gasket cements, as a base for house paint, as a base for an automobile finish, as aeroplane dope, as waterproof coatings for paper and fabrics of all kinds and as insulating protective coatings in electric wiring.

In a specific embodiment of the present invention giving a lightly petronized varnish, 100 parts by weight of butyl ether stearic acid ester of glycol (butyl cellosolve stearate), 500 parts tricresyl phosphate, 150 parts decalin, 120 parts paracymene, 1200 parts "High-Flash solvent naphtha" (a commercial mixture of light coal tar oils), 1750 parts of xylol and 1530 parts of toluol are mixed. After admixture is complete 1650 parts of dry, neutral, stable, commercial rubber chloride are stirred in until mixture is effected. To this batch is added a separately prepared solution of petronizer, this consisting of 16.5 parts by weight of piperidine pentamethylene dithiocarbamate and 64 parts of toluol or other coal tar oil. This solution is stirred in to effect complete dispersion. After this addition, the liquid gradually becomes somewhat darker, but apparently not by oxidation. Prolonged standing shows no other effect. Applied to a surface and air dried in the usual manner, the resultant film, in the course of a few days, will become noticeably resistant to wetting with toluol and xylol. It is also noticeably harder and freer of aftertack. By baking at 90° C. for 8 hours, it darkens somewhat and becomes exceedingly hard and tough, and is much more resistant to wetting with toluol and xylol. It has lost thermoplasticity and is tack-free when warm.

Another lacquer can be prepared by using the rubber chloride solution made as described but adding to it a different petronizer. In this case the solution added consists of 16.5 parts by weight of tetramethyl thiuram monosulphide and 32 parts, more or less of "Chlorex" (dichlorethyl ether).

Applying either of the lacquers just described to metal or wood panels exposed to the weather, the coating at the end of some months is much better than that of a similar coating without the petronizing addition. It does not tend to crack or check, gloss is retained to a more satisfactory degree and it is so free of aftertack as not to catch and retain soot and other dirt.

In the example given the amount of volatile solvent is large enough to produce a fluent and flowable composition which can be used as varnish and dried in place by evaporation. By lessening the quantity of solvents, somewhat plastic compositions are made which can be extended, cast, milled together with fillers on rubber mills, etc. In so doing merely enough volatile solvent is used to enable working and afterwards this small quantity of solvent is evaporated. The compositions are plastic and can be hot molded, etc., but in the presence of a petronizer, after molding or in the later stage of molding, they lose plasticity and become firm at the temperature used. In making compositions of this character, volume changes are important and in expelling solvent it is desirable to secure complete expulsion without retention of any residue. As pointed out in another and copending application, even evaporation of solvents from this type of composition depends largely upon a rather definite balance between high boiling, low boiling and medium boiling liquids, taking their molecular weights into consideration. Such a balance is obtained in the example given.

Rubber chloride always contains a certain amount of carry-over impurities from the original rubber; particles representing proteids, gums. carbohydrates, etc. The amount of this impurity is very little but it is enough to noticeably affect the resistance of the rubber chloride to water, and therefore, to acid, alkaline and saline solutions. Particles of these impurities take up water and give localized spots where swelling can take place and avenues may be opened through to the underlying surfaces. In making completely protective rubber chloride coatings, these impurities should be absent.

In another application I have described and claimed a method of removing these impurities which exist as a turbidity or haze in rubber solution by a treatment with flocculating, coagulating and collecting solids, these usually including some decolorizing carbon and thereafter clarifying by filtration or centrifugal action. Rubber chloride purified by removing these impurities is particularly applicable in the present method of producing highly resistant films and articles.

In a particular embodiment of the present invention, making an exceptionally high grade varnish giving complete protective action, even under trying circumstances, a liquid mixture is made containing, in parts by weight, butyl cellosolve stearate 100, tricresylphosphate 500, decahydronaphthalene 150, paramethylisopropylbenzene 10 and Hi-Flash solvent naphtha (coal tar hydrocarbon) 300. When complete mixture is secured, 1650 parts by weight of good, dry, commercial rubber chloride are added and stirred in.

The admixture is then heated to about 80° C. in a closed vessel and maintained at this temperature until "solvation" is completed, i. e., until a uniform plasticized composition has been obtained. With suitable agitation this will be accomplished in from 8 to 12 hours. While the "solvated rubber chloride" is still warm the following solvents are added in the proportions indicated in parts by weight: High-Flash solvent naphtha 900, xylol 1750 and toluol 1530. With suitable agitation a complete dispersion is obtained in a few hours.

To this dispersion is now added 16.5 parts by weight of a previously baked and dried commercial decolorizing carbon, such as eponite. Other decolorants and collecting means may be used but the commercial decolorizing carbon is good. The mixture is heated to 80° C. for one-half hour or so, and then carefully filtered through a press fitted with cloths and precoated with a pad of "Hyflo" (a processed infusorial earth). The filtrate will be clear and free of haze or turbidity, showing at most only a little Tyndall effect with transmitted light.

To this clear liquid is now added a petronizer, this consisting of a separately prepared solution of 16.5 parts by weight of piperidine pentamethylene dithiocarbamate and 64, more or less, parts by weight of toluol or other suitable solvent. The separate solution is uniformly incorporated by good stirring. After its addition there is some slight darkening.

The varnish composition applied to glass and tested as described, gave better results than corresponding films of preparations in which haze removal is omitted. Films baked at 90° C. for three hours withstood prolonged immersion in water without development of a haze. There was no fog frosting or disintegration.

In a test of acid resistance, a petronized liquid varnish was ground with a filler and then applied to metal. In one case, for 68 parts of base material there were used 4 parts by weight of chromic oxide and 4 parts by weight of fine silica, the mixture being ground in a ball mill for 8 hours and strained to remove coarse matter. Metal rods were dipped in these pigmented coated materials and allowed to drain, being afterwards baked for 8 hours at 80 to 90° C. This treatment was then followed by 2 or 3 coats of unpigmented solution, the rods being baked after each treatment. Sanding treatments were applied to give a smooth surface. A rod was coated and then cut into lengths, the ends being protected by dipping in "Halowax" No. 1014—a commercial, highly chlorinated, naphthalene preparation. Comparative tests were made with the same liquid with and without petronization. Without petronization, the coated rod in 35 per cent hydrochloric acid at room temperature failed in 96 hours, the metal being attacked in a few isolated spots. With petronization, there was no effect observed at the end of 21 days. Rods in hot hydrochloric acid solution at water-bath temperature gave comparative resistances. The petronized rod showed no bubbles for the first 46 hours at 70° C., and bubbling ceased on dropping the temperature to that of the room, 22° C. The rod was intact at the end of 21 days.

In making plastic compositions for molding, etc., the same quantities of the various bodies mentioned may be used as given in the example, with the exception that considerably less volatile solvent is employed. Various fillers such as fine zinc oxide may be employed. Softeners such as stearic acid, halo wax, tricresylphosphate, etc., may be added to obtain special softness. The plastic composition may be extruded while hot in the form of a thread or a wire insulation, the extruded product being then carried through a petronizing solution which may be, for example, a solution of 20 parts by weight of piperidine pentamethylene dithiocarbamate in 60 parts of toluol. The toluol solution is taken up by and penetrates the mass of the extruded body. After treatment the article is carried through a heater, advantageously of the vertical or tower type and the temperature is quickly raised to 100° C. The surface sets and about 15 minutes heating produces an elastic coating or thread exceedingly fire resistant, proof against moisture and water and having a high insulating value. It is not affected by oxidation, even by ozone; or by oils, greases, acids, alkalis, etc.

As just described, the petronizer was applied after formation of a shaped plastic body. Instead, solvated rubber chloride may be incorporated with petronizer on the mill and the mass calendered in sheets, calendered to fabric and paper, sheared, hot molded, etc. A final hot treatment is used to effect petronization in the sheet. When produced as described the final composition has much the elasticity of rubber.

While, as stated, most of the bodies chemically reactive with rubber seem to function in the present invention, the best results appear to be obtained by organic compounds characterized by a structure in which a middle carbon atom is doubly linked to either nitrogen or sulfur; that is, a carbon atom

Organic compounds having this structure are particularly effective in petronization. It occurs in the thioureas and ureas, di-thiocarbamic acid, thiuram sulfides, mercapto thiazoles, xanthates, carbanilides and guanidines. It also occurs in saline compounds of these bodies and their aryl substitution products. Some of these compounds are more active than others, some indeed being so active as to permit their use only in very small quantity and in special cases. Activity as petronizing agents is not limited to compounds in which nitrogen or sulfur is connected to a carbon atom of a chain by double linkage but it does generally characterize those compounds. There are organic compounds which are petronizers which do not have this structure and there are inorganic compounds, such as zinc oxide, which may aid in petronization.

What I claim is:

1. A composition consisting essentially of rubber chloride and a volatile solvent and a minor amount of petronizing agent adapted to effect a progressive insolubilizing action on the rubber chloride in the absence of the solvent, said action being accelerated by heating and said petronizing agent being selected from the class consisting of ureas, thioureas, dithiocarbamic acids, thiuram sulfides, mercapto-thiazoles, xanthates, carbanilides, guanidines and their saline compounds and aryl substitution products, and the reaction products of aldehydes and amines.

2. The composition of claim 1, wherein the petronizing agent is tetramethyl thiuram monosulfide.

3. The composition of claim 1, wherein the petronizing agent comprises diphenyl guanidine.

4. The composition of claim 1, wherein the petronizing agent comprises a dithiocarbamate.

5. The composition of claim 1, wherein the petronizing agent is present in an amount of the order of 1 per cent on the rubber chloride.

6. The composition of claim 1, wherein the said rubber chloride is in purified and haze-free condition.

7. The process of treating rubber chloride to modify its physical properties, which comprises mixing normal rubber chloride with a minor amount of petronizing agent in the presence of a volatile solvent and subsequently eliminating solvent from the resulting composition, said petronizing agent being a material capable of inducing internal reactions in the rubber chloride and being selected from the class consisting of ureas, thioureas, di hiocarbamic acids, thiuram sulfides, mercapto-thiazoles, xanthates, carbanilides, guanidines and their saline compounds and aryl substitution products, and the reaction products of aldehydes and amines.

8. The process of claim 7, wherein the said composition is heated to eliminate the solvent and accelerate the action of the petronizing agent.

9. The process of claim 7, wherein there is sufficient volatile solvent present to form a fluid, varnish-like dispersion which is applied to a surface before eliminating the solvent.

10. The process of claim 7, wherein there is sufficient solvent present to form a thermoplastic mass of solvated rubber chloride, which is then shaped and heated.

11. The process of claim 7, wherein the said petronizing agent is applied in solution to a shaped thermoplastic mass comprising said rubber chloride and solvents therefor, and the mass is then heated.

12. The process of claim 7, wherein the said petronizing agent is added in an amount of the order of 1 percent on the rubber chloride.

13. The process of treating rubber chloride to modify its physical properties, which comprises mixing normal rubber chloride with an amount of petronizing agent of the order of 1 per cent on the rubber chloride in the presence of a volatile solvent and subsequently eliminating solvent from the resulting composition and heating to a temperature of about 80° to 150° C. for a period sufficient to effect the desired degree of petronization, said petronizing agent being selected from the class consisting of ureas, thioureas, dithiocarbamic acids, thiuram sulfides, mercapto-thiazoles, xanthates, carbanilides, guanidines and their saline compounds and aryl substitution products, and the reaction products of aldehydes and amines.

JAMES WALLACE RAYNOLDS.

CERTIFICATE OF CORRECTION.

Patent No. 2,148,831.          February 28, 1939.

JAMES WALLACE RAYNOLDS.

It is hereby certified that error appears in the printed specification of the above numbered patent requiring correction as follows: Page 3, second column, line 69, for the numeral "10" read 120; and that the said Letters Patent should be read with this correction therein that the same may conform to the record of the case in the Patent Office.

Signed and sealed this 11th day of April, A. D. 1939.

Henry Van Arsdale

Acting Commissioner of Patents.

(Seal)

6. The composition of claim 1, wherein the said rubber chloride is in purified and haze-free condition.

7. The process of treating rubber chloride to modify its physical properties, which comprises mixing normal rubber chloride with a minor amount of petronizing agent in the presence of a volatile solvent and subsequently eliminating solvent from the resulting composition, said petronizing agent being a material capable of inducing internal reactions in the rubber chloride and being selected from the class consisting of ureas, thioureas, dithiocarbamic acids, thiuram sulfides, mercapto-thiazoles, xanthates, carbanilides, guanidines and their saline compounds and aryl substitution products, and the reaction products of aldehydes and amines.

8. The process of claim 7, wherein the said composition is heated to eliminate the solvent and accelerate the action of the petronizing agent.

9. The process of claim 7, wherein there is sufficient volatile solvent present to form a fluid, varnish-like dispersion which is applied to a surface before eliminating the solvent.

10. The process of claim 7, wherein there is sufficient solvent present to form a thermoplastic mass of solvated rubber chloride, which is then shaped and heated.

11. The process of claim 7, wherein the said petronizing agent is applied in solution to a shaped thermoplastic mass comprising said rubber chloride and solvents therefor, and the mass is then heated.

12. The process of claim 7, wherein the said petronizing agent is added in an amount of the order of 1 percent on the rubber chloride.

13. The process of treating rubber chloride to modify its physical properties, which comprises mixing normal rubber chloride with an amount of petronizing agent of the order of 1 per cent on the rubber chloride in the presence of a volatile solvent and subsequently eliminating solvent from the resulting composition and heating to a temperature of about 80° to 150° C. for a period sufficient to effect the desired degree of petronization, said petronizing agent being selected from the class consisting of ureas, thioureas, dithiocarbamic acids, thiuram sulfides, mercaptothiazoles, xanthates, carbanilides, guanidines and their saline compounds and aryl substitution products, and the reaction products of aldehydes and amines.

JAMES WALLACE RAYNOLDS.

CERTIFICATE OF CORRECTION.

Patent No. 2,148,831.   February 28, 1939.

JAMES WALLACE RAYNOLDS.

It is hereby certified that error appears in the printed specification of the above numbered patent requiring correction as follows: Page 3, second column, line 69, for the numeral "10" read 120; and that the said Letters Patent should be read with this correction therein that the same may conform to the record of the case in the Patent Office.

Signed and sealed this 11th day of April, A. D. 1939.

Henry Van Arsdale

Acting Commissioner of Patents.

(Seal)